US005593076A

United States Patent [19]
Biondo

[11] Patent Number: 5,593,076
[45] Date of Patent: Jan. 14, 1997

[54] CAR CARRIER RACK AND CAR MOUNT

[76] Inventor: Barry Biondo, 87 Willard Ter., Stamford, Conn. 06903

[21] Appl. No.: 524,053

[22] Filed: Sep. 5, 1995

Related U.S. Application Data

[63] Continuation of Ser. No. 173,648, Dec. 27, 1993, abandoned.

[51] Int. Cl.⁶ .................................................. B60R 9/10
[52] U.S. Cl. .......................... 224/488; 224/492; 224/495; 224/509; 224/511
[58] Field of Search ................................. 224/488, 489, 224/492, 495, 509, 511, 512, 513, 518, 329, 330, 924

[56] References Cited

U.S. PATENT DOCUMENTS

| | | | |
|---|---|---|---|
| 2,011,004 | 8/1935 | Love . | |
| 4,035,093 | 7/1977 | Redshaw . | |
| 4,057,182 | 11/1977 | Kolkhorst et al. | 224/924 |
| 4,411,461 | 10/1983 | Rosenberg | 224/924 |
| 4,597,603 | 7/1986 | Trabert . | |
| 4,620,736 | 11/1986 | Shanks | 224/42.03 R |
| 4,676,414 | 6/1987 | Deguevara . | |
| 4,767,038 | 8/1988 | McVicar | 224/42.12 |
| 4,856,686 | 8/1989 | Workentine | 224/42.03 B |
| 4,884,728 | 12/1989 | Temple . | |
| 4,971,237 | 11/1990 | Davis . | |
| 5,004,133 | 4/1991 | Wyers . | |
| 5,052,605 | 10/1991 | Johansson | 224/330 |
| 5,056,700 | 10/1991 | Blackburn et al. | 224/42.03 B |
| 5,067,641 | 11/1991 | Johnson et al. | 224/42.03 B |
| 5,096,102 | 3/1992 | Tolson . | |
| 5,169,042 | 12/1992 | Ching . | |
| 5,215,232 | 6/1993 | Wyers | 224/42.03 B |
| 5,219,105 | 6/1993 | Kravitz . | |
| 5,232,135 | 8/1993 | Marren | 224/509 |
| 5,236,342 | 8/1993 | Pellettier | 224/42.03 R |
| 5,259,542 | 11/1993 | Newbold et al. | 224/42.03 B |
| 5,282,555 | 2/1994 | Muir et al. | 224/42.03 B |
| 5,373,978 | 12/1994 | Buttchen et al. | 224/924 |
| 5,377,885 | 1/1995 | Wyers | 224/924 |
| 5,527,146 | 6/1996 | Allsop et al. | 224/924 |

FOREIGN PATENT DOCUMENTS

| | | | |
|---|---|---|---|
| 2077917 | 5/1993 | Canada | 224/42.03 B |
| 128088 | 12/1984 | European Pat. Off. | 224/924 |
| 2642024 | 7/1990 | France | 224/924 |

*Primary Examiner*—Henry J. Recla
*Assistant Examiner*—Charles R. Eloshway
*Attorney, Agent, or Firm*—St. Onge Steward Johnson & Reens

[57] ABSTRACT

A carrier rack for a car is described for attachment to a car mount. The car mount is connected to the license plate area of the car using the same mounting holes as the license plate. The carrier rack is formed of a simple structure having a main rack member attachable to the car mount and extending generally upright to an upper member which is movably mounted to the main rack member and is reversible for the mounting of bikes or skis. A bike mount is used that provides both vertical and side support of a bike and is convenient to use. Ski mounts are placed on the main rack and upper members to support skis in an adjustable manner.

21 Claims, 7 Drawing Sheets

CAR CARRIER RACK AND CAR MOUNT

This is a continuation of application Ser. No. 08/173,648 filed on Dec. 27, 1993, now abandoned.

FIELD OF THE INVENTION

This invention generally relates to car mountable racks and car mountings for use therewith. More specifically, this invention relates to a carrier rack and car mounting for supporting bicycles or skis and the like.

BACKGROUND OF THE INVENTION

Bicycle racks for cars are well known. Typically, a car mountable rack includes a support system of complex construction that is time consuming to attach. For example, U.S. Pat. No. 5,096,102 to Tolson describes a carrier which is mounted to a receiver which has a car attachment plate mounted behind a license plate using the license plate mounting holes. A shelf extends from the plate behind the license. The shelf in turn is provided with a hollow conduit into which an elongate post of the carrier is inserted. The shelf structure has reinforcement bars and foot plates for seating of the shelf on a car bumper. A carrier rack is described requiring a stabilizer bracket and special rod mountings for a bike that make the carrier complicated to install and assemble and not necessarily strong and stable in use.

Other bike carriers are described and shown in U.S. Pat. Nos. 4,411,461; 4,884,728; 5,004,133; and 5,169,042. In U.S. Pat. No. 5,219,105 a bike carrier for a front bumper is shown using a mounting plate that fits the license plate mounting holes at the front bumper.

SUMMARY OF THE INVENTION

With a carrier rack in accordance with the invention, a frame structure is employed that is convenient to install yet quite sturdy and stably supported by a strong easily installed car mount. The carrier rack is formed with a main member whose lower end is shaped to engage a rack receiver in a car mount in an interlocking manner and whose upper end is shaped to interlockingly receive an adjustable upper member. The upper member can be positioned to face rearwardly of the car to support a bike or forwardly to support skis over the car trunk.

A bike mount is placed in a movable interlocking manner on the upper member. The bike mount interlockingly engages both the upper and seat tubes of the bike frame so as to grip the bike firmly in a balanced and stable position for both vertical and side support.

Ski mounts are provided to movably attach to both the main and upper members when the latter is oriented to face forwardly. Skis are convenient to attach.

With a car mount in accordance with the invention, the carrier rack for supporting bicycles, skis and the like is conveniently and quickly attached. This is achieved by employing a car mount in the form of a heavy-duty metal car attachment plate which is affixed behind a license plate directly to a car. The car mount uses the same holes as employed for license plates so that screw bolts can be used to mount both the license plate and the car mount at the license plate area of the car in a manner that does not require stabilizing supports or special reinforcing bars.

As described in one embodiment, the car mount further has a horizontally-extending rack receiver at the lower end of the car attachment plate to engage a carrier rack. The rack receiver has a cross-sectional shape selected to provide an interlocking engagement with the carrier rack without permitting rotation of the carrier rack relative to the rack receiver.

As described for one form of the invention, the rack receiver includes an L-shaped bracket mounted to the car attachment plate so that a shelf portion extends outwardly from the car attachment plate below the license plate. A rack receiver in the form of a rectangular tubular section is affixed to the top of the shelf portion and extends in a generally horizontal rearward direction. The tubular section is sufficiently spaced from the car attachment plate to form a gap in which a portion of the license plate can fit when it, with the plate, are attached to the car with suitable screw bolts extending through license plate mounting holes. Reinforcing backing plates are used inside the car to provide a firm mounting of the car attachment plate to the car.

With a car mount and carrier rack in accordance with the invention externally stored items such as bikes, skis and the like are conveniently mounted to a car in a safe manner.

It is, therefore, an object of the invention to provide a convenient and safe car mount and carrier rack to which devices such as bikes and skis can be mounted. It is a further object of the invention to provide a carrier rack for convenience and safe attachment to a car mount.

These and other objects and advantages of the invention can be understood from the following detailed description of one form of the invention as illustrated in the drawings.

DETAILED DESCRIPTION OF DRAWINGS

Figure 1:
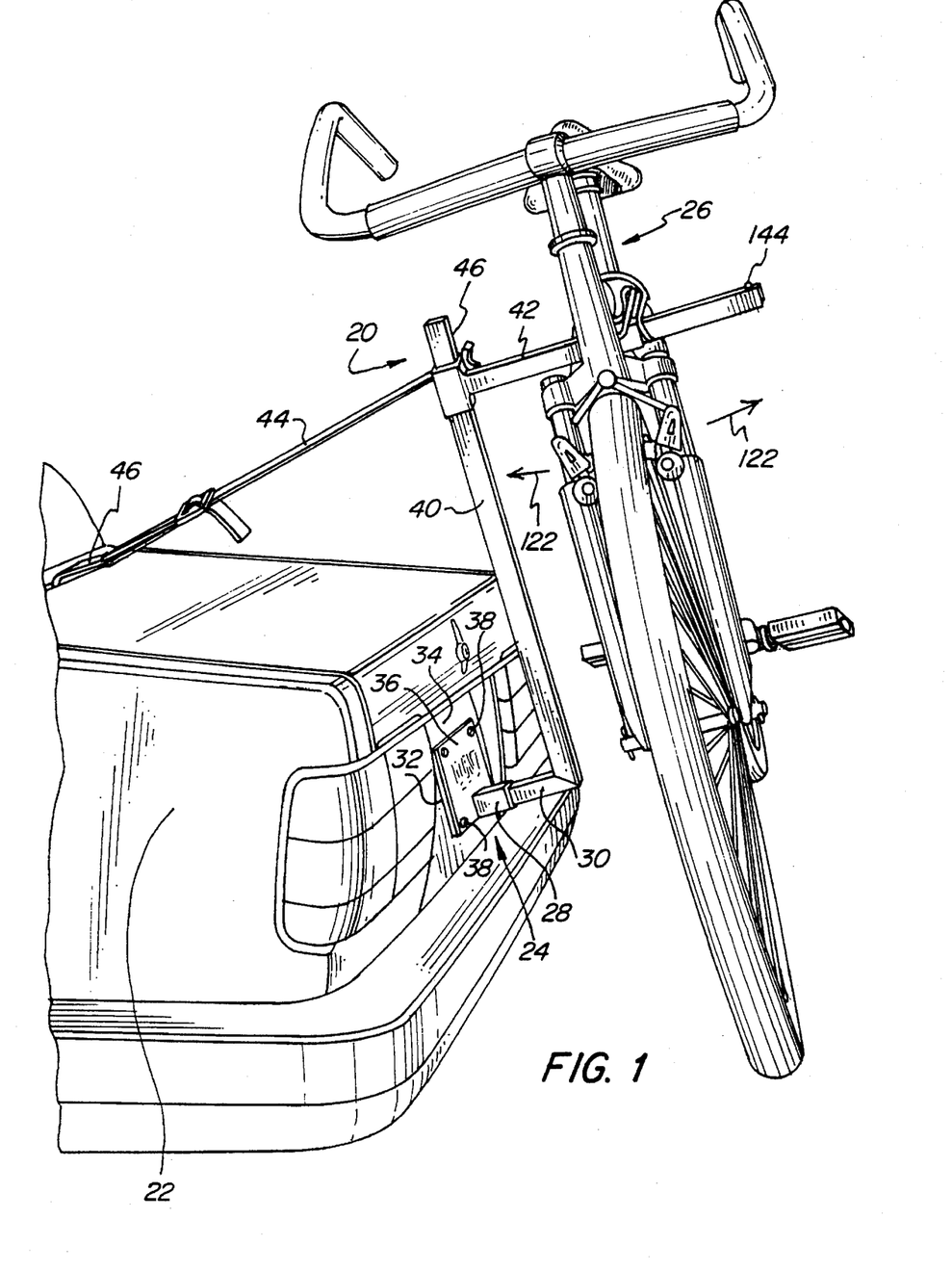
FIG. 1 is a side perspective view of a car mount and carrier rack in accordance with the invention and mounted on a car.

With reference to FIG. 1 a carrier rack 20 is shown mounted to a car 22 with a car mount 24 in accordance with the invention to support a bicycle 26. The car mount 24 includes a rack receiver 28 shaped and sized to engage a lower end or member 30 of rack 20 in an interlocking manner.

The car mount is formed with a car attachment plate 32 located in the license plate area 34 of car 22 and behind the rear license plate 36. Bolts 38 are used to attach the license plate 36 and car attachment plate 32 to the rear body of car 22.

Rack 20 includes a main member 40 which is firmly affixed, such as by welding or other suitable manner, to lower member 30. Main member 40 extends in a generally upright direction and can be an integral part with the lower member 30 such as by bending of a tubular section. An outwardly extending member 42 engages main member 40 in an adjustable manner to select an optimum height for bike 26. Bicycle 26 is firmly held on member 42. An adjustable strap 44 is used to anchor the upper end 46 of middle member 40. Strap 44 includes a firm plastic L-shaped clip 46 to engage an available trunk edge. Strap 44 is not essential, but enhances the stability of the rack 20.

Figure 2:
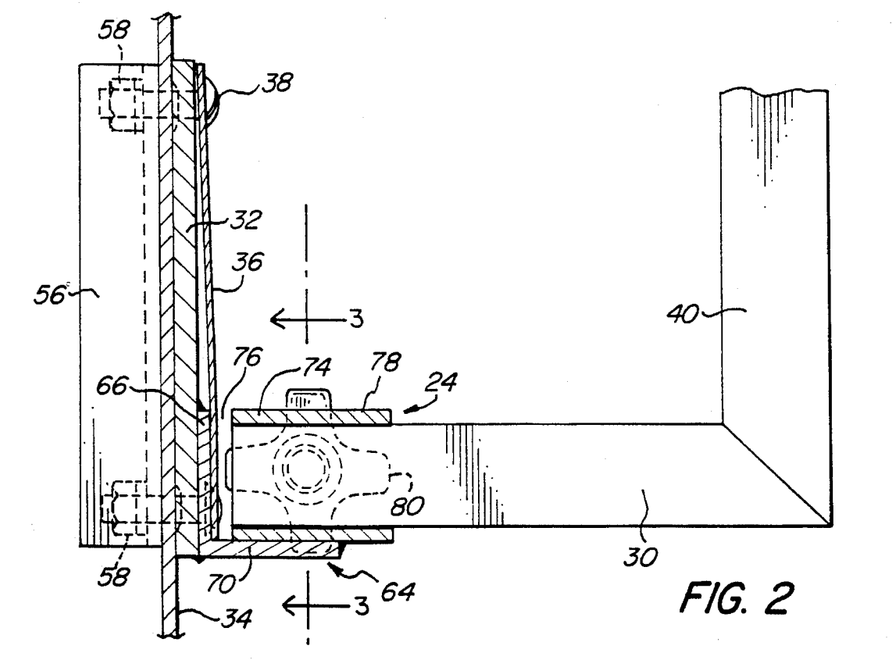
FIG. 2 is an enlarged sectional view of a car mount in accordance with the invention.
Figure 3:
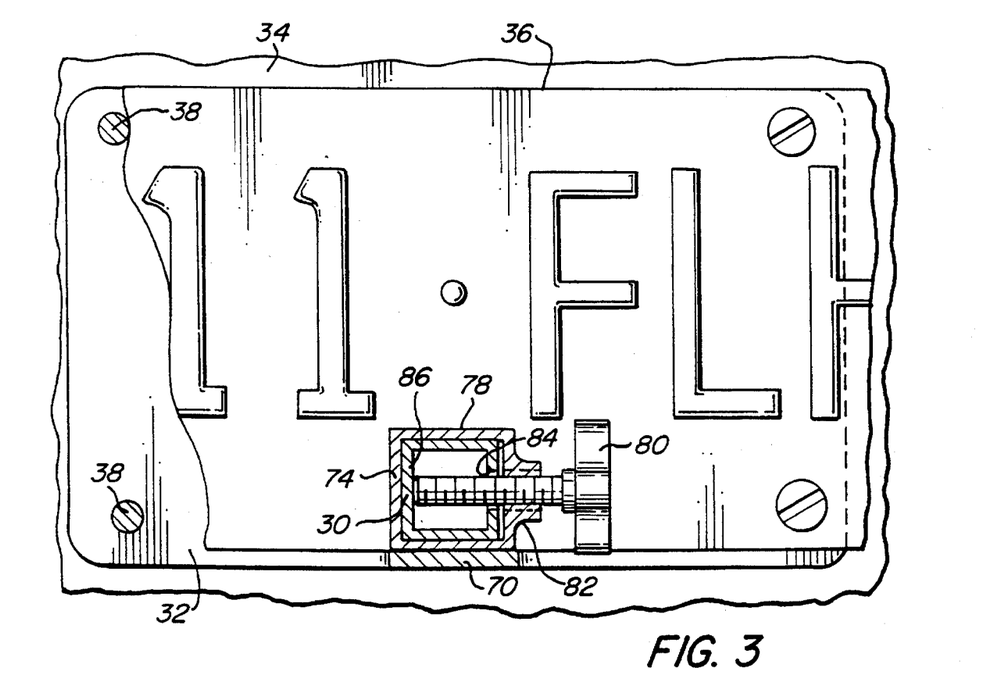
FIG. 3 is a rear partially broken away and section view of the car mount taken along the line 3—3.
Figure 4:
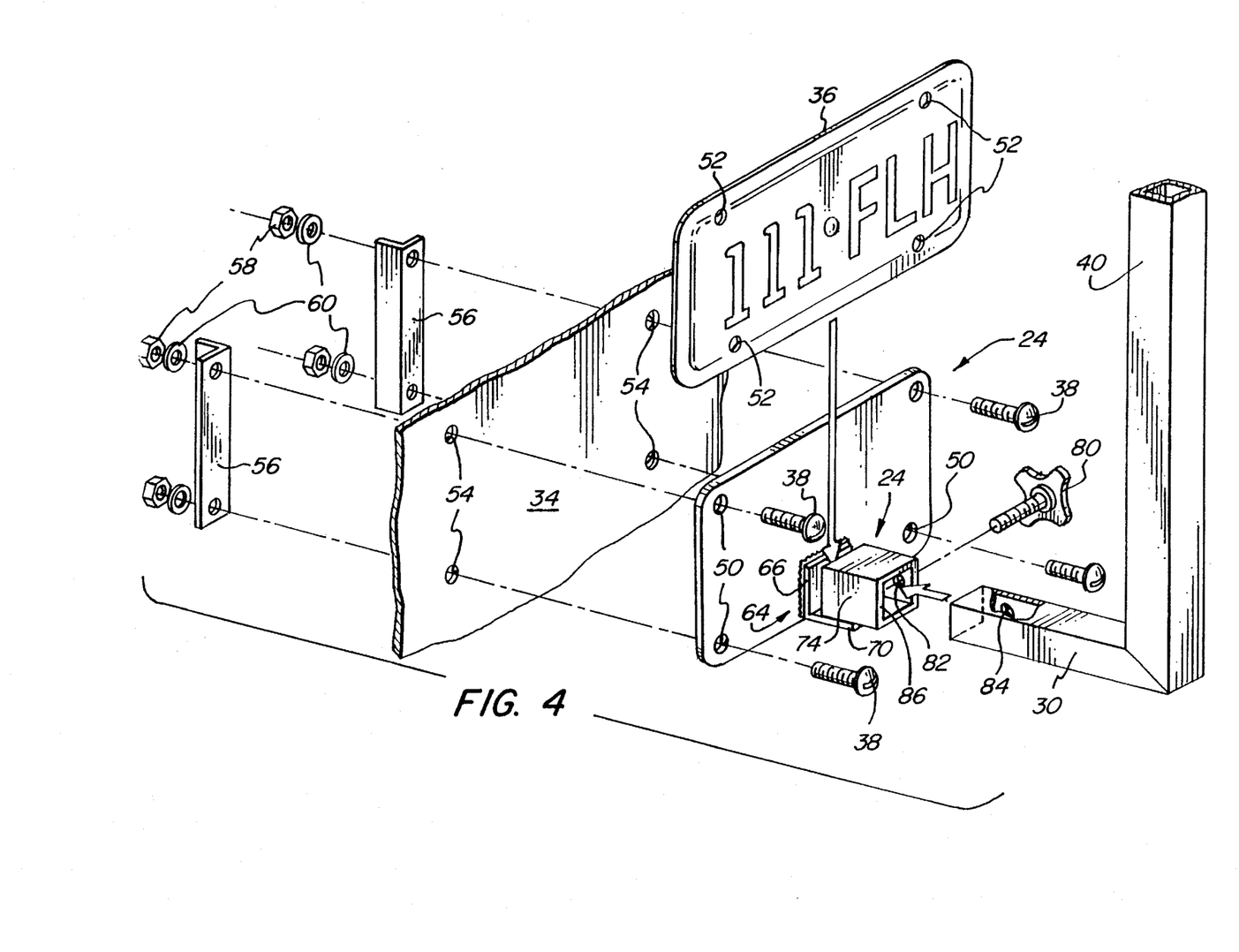
FIG. 4 is a perspective exploded view of the car mount and portion of the carrier rack shown in FIGS. 1, 2, and 3.
Figure 5:
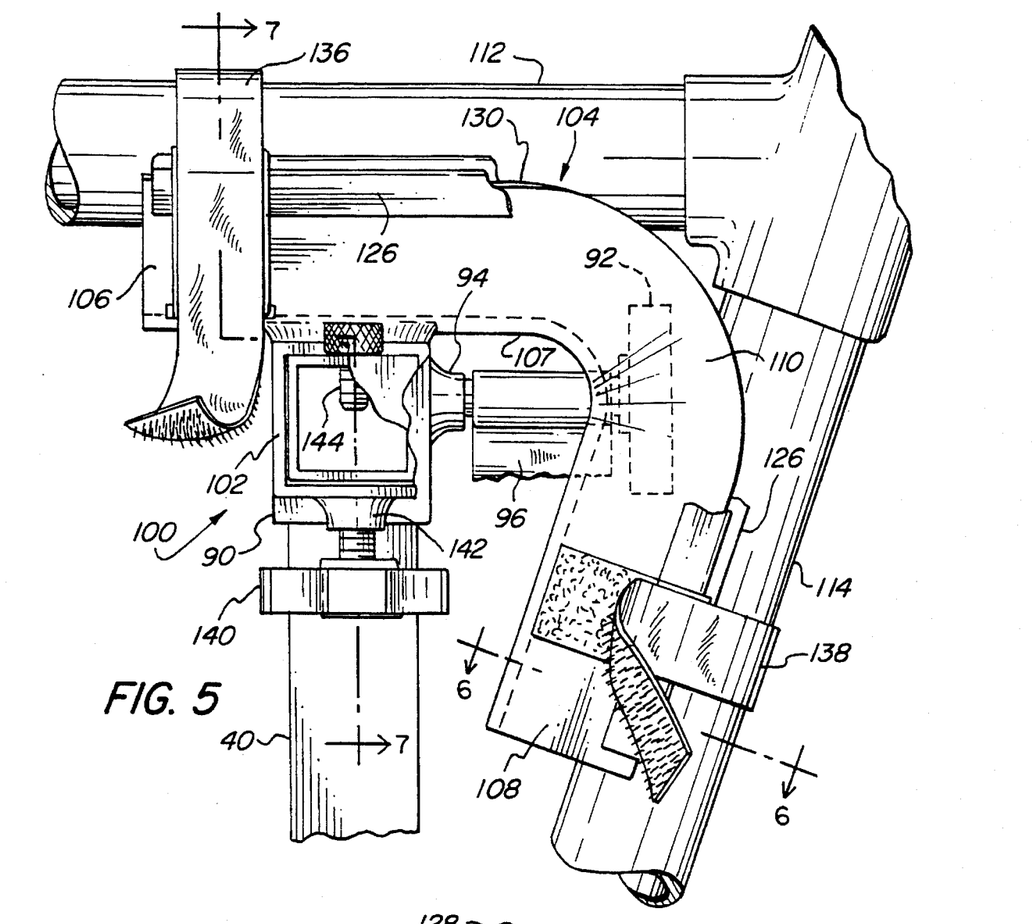
FIG. 5 is a partial rear view in elevation of a bicycle support in accordance with the invention for use on a carrier rack as illustrated in FIG. 1.
Figure 6:
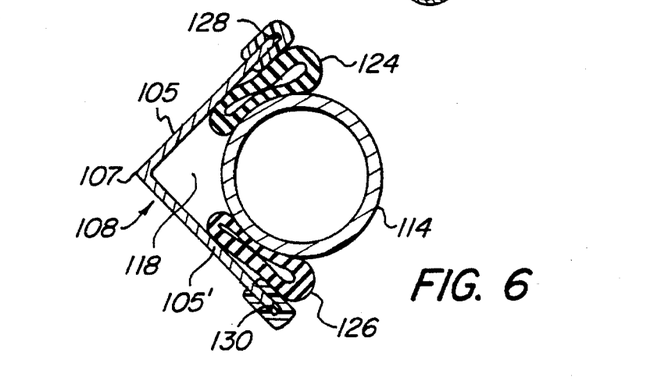
FIG. 6 is a section view of a seat tube of a bicycle and the bicycle and the bicycle support taken along the line 6—6 in FIG. 5.
Figure 7:
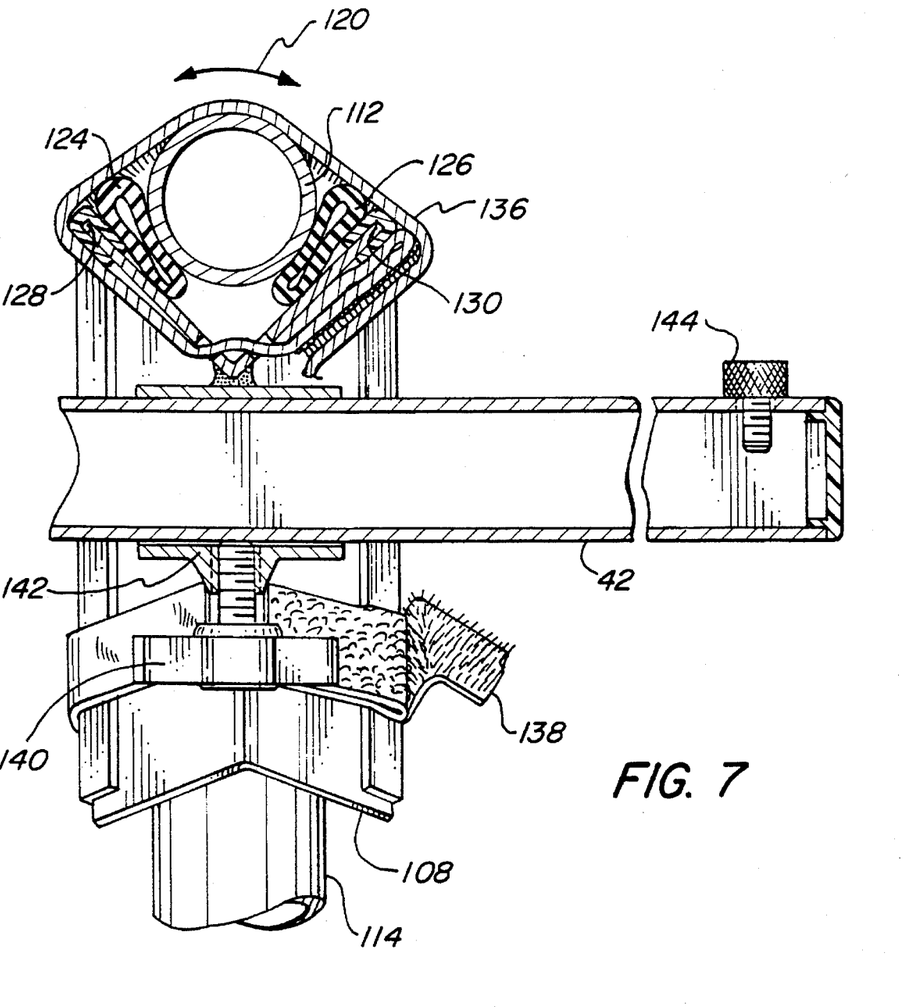
FIG. 7 is a section view of the top tube of a bicycle, a part of the carrier rack and the bicycle support taken along the line 7—7 in FIG. 5.

The car mount 24 is shown with greater detail in FIGS. 2–4. The car mount 24 is formed with a strong car attachment plate 32 made preferably of at least about 1/8 inch thick steel. Plate 82 has mounting holes 50 which are spaced at like distances as license plate holes 52 and the mounting holes 54 in the car body 56 at license plate area 34.

Typically, the mounting holes 54 have nylon nuts to receive license plate mounting bolts. In the invention these nylon inserts are preferably dispensed with so that bolts 38 can extend through holes 54 to engage reinforcing bars 56 located inside the car trunk against the inside surface of the license plate area 34. Nuts 58 and washers 60 are used to firmly attach car attachment plate 32 in a flush-fitting manner to car body area 34.

The lower end of car attachment plates 32 is provided with an L-shaped angle bracket 64. An upper segment 66 is firmly affixed to plate 32 such as by welding while a lower shelf 70 extends outwardly. The rack receiver 24 is in the form of a heavy gauge rectangular tubular section 72 which is affixed to shelf 70 by welding, though other attachments techniques may be used.

The rack receiver section 72 is preferably placed on top of shelf 70 though section 72 could be welded below shelf 70. Receiver section 70 is further so spaced from plate 32 as to form a gap 74 through which license plate 36 and a frame can fit. The top surface 78 of receiver section 72 is placed below the lettering and numbers on license plate 36.

In the embodiment, bracket 64 has the lower surface of the shelf 70 flush with the bottom edge of car attachment plate 32. This accommodates those license plate areas 34 where there is little room for a lower position of bracket 64. In some instances a lower position of bracket 64 can be used and if needed, the bracket 64 can extend from above the license plate by affixing bracket segment 66 to the top of plate 32.

The cross-sectional shape of rack receiver 24 is selected so that section 74 can engage lower member 30 of rack 20 in interlocking relationship and prevent relative rotation. One such shape is a rectangular cross-section for both the receiver section 74 and lower member 30. However, other dove-tail fitting cross-sectional shapes for the receiver section 74 and lower member 30 can be used.

In the embodiment, the lower member 30 snugly fits within the section 74; though conceivably receiver section 74 can be extended so as to snugly fit inside lower member 30. The rectangular shapes of the bore 76 of receiver section 74 and the external surface of lower member 30 assure a firm fixed relationship that does not permit rotation of rack 20 relative to car mount 24.

When installed, carrier rack 20 is held in place inside receiver section 74 with a hand bolt 80 which meshingly engages a nut 82 on section 74 and freely penetrates a hole 84 in member 30 to seat against a far wall 86 of lower member 30. The tightening of handbolt 80 forces lower member 30 against a wall of receiver section 74 while also positively interlocking them together.

Figure 8:
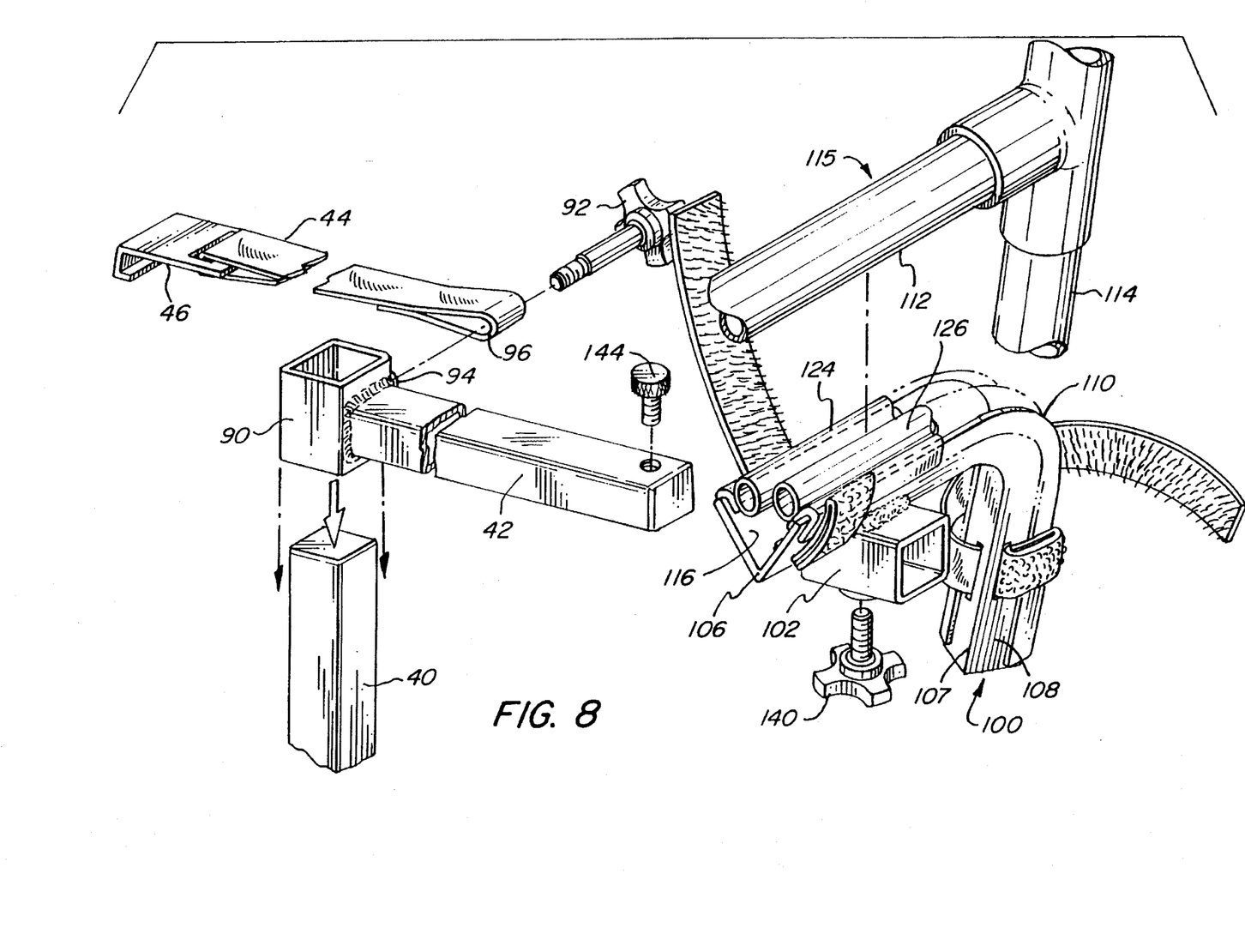
FIG. 8 is an exploded view of a top portion of the carrier rack and the bicycle support of the invention as shown in FIGS. 5 and 7.

Attachment of outwardly extending upper member 42 and the mounting bracket used to hold a bike 26 are illustrated with greater detail in FIGS. 5–8. As shown in FIGS. 1 and 8, the upper member 42, which like members 30 and 40, is formed of rectangular stock steel, has a rectangular cross-section sleeve 90 welded on at one end. Sleeve 90 is sized to slide along main member 40. A hand bolt 92 which meshes with a nut 94 mounted to sleeve 90 enables clamping of sleeve 90 anywhere along main member 40. Hand bolt 92 is made sufficiently long to extend through a loop 96 of strap 44 to firmly couple the strap to carrier rack 20.

As shown in FIGS. 5–8, a bike mount 100 is provided that can be positioned anywhere along upper member 42. The bike mount 100 includes a rectangular sleeve 102 which snugly fits around the rectangular outwardly-extending upper member 42. A V-shaped bike support 104 is welded to sleeve 102 or may be affixed thereto in some other manner. The bike support 104 is in the shape of an angle bracket whose sides 105, 105' meet at right angles at an elongate corner 107. The angle bracket 104 is bent to form an elongate upper support 106 and elongate side support 108 which are connected along a curved corner segment 110. The bike support 104 is sized and shaped to respectively and partially receive the top tube 122 and seat tube 114 of triangular bike frame 115 inside the open grooves 116, 118 of upper support 106 and side support 108.

The length of the upper support 106 is selected to provide a stable support for bike 26 against pivot motion about upper member 42, i.e., in the directions indicated by double-headed arrow 120. The length of side support 108 is selected to provide support against pivot motion towards and away from car 22 in the directions indicated by arrows 112 in FIG. 1.

Elongate commercially-available rubber cushions 124, 126 are placed inside grooves 116, 118 by suspending the cushions from outer edges 128, 130 of bike support 104. Attachment of the bike 26 to bike support 104 may be done with wide, strong Velcro-type straps 136, 138 having one end respectively affixed to the upper support 106 and side support 108.

Attachment of the bike mount 100 to a desirable position along upper member 42 involves a hand bolt 140 which meshingly engages a nut 142 on sleeve 102. A removable screw 144 is used near the outer end of member 42 to prevent any accidental sliding off of bike mount 100 from member 42.

Figures 9, 10:
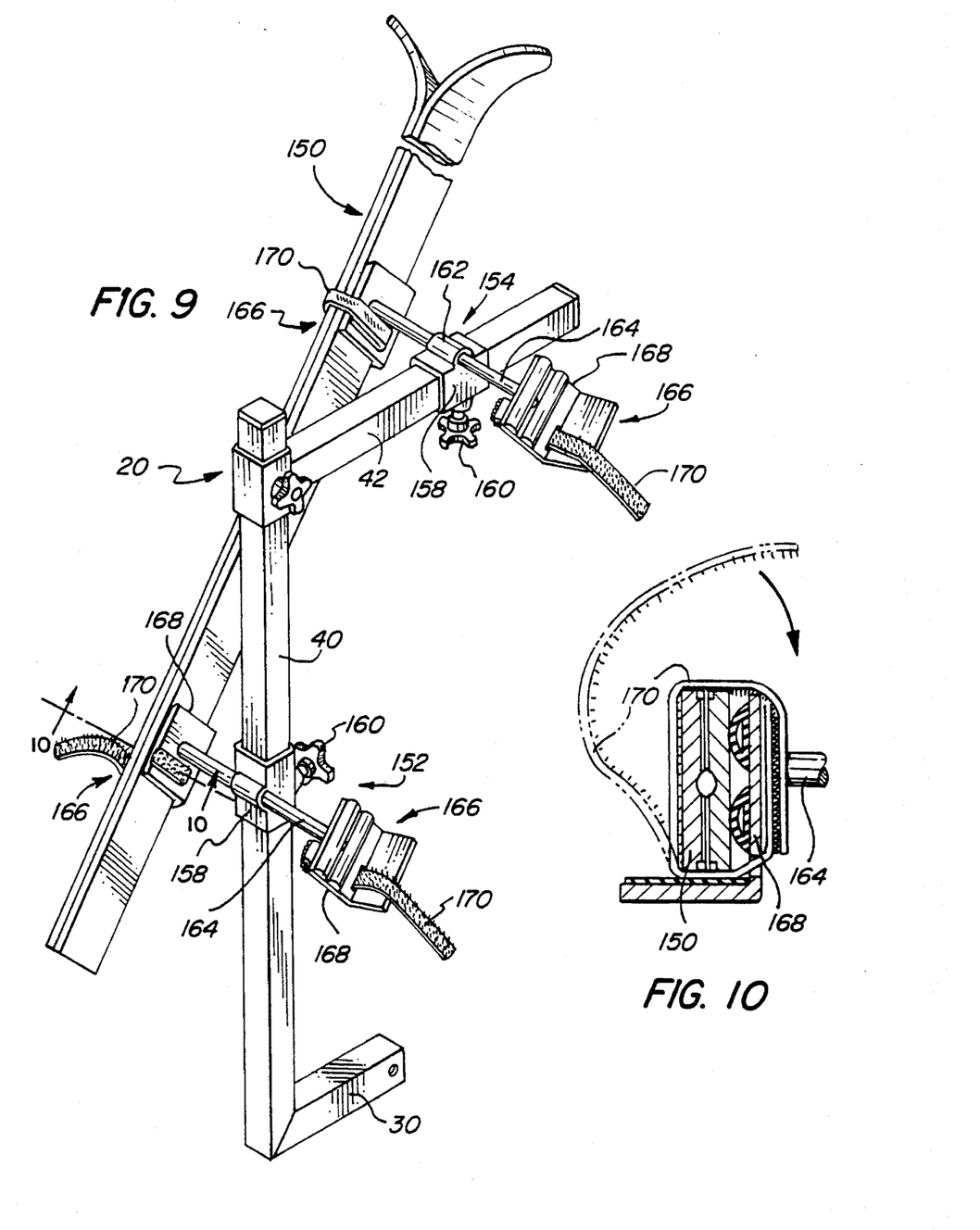
FIG. 9 is a perspective view of the carrier rack and accessories for holding skis on a rack in accordance with the invention.
FIG. 10 is a section view of a ski support taken along the line 10—10 in FIG. 9.

With reference to FIGS. 9 and 10, the carrier rack 20 is shown adapted to enable one to carry several sets of skis 150, only one set being shown, using ski mounts 152, 154 respectively placed on main rack member 42 and upper member 156. The orientation of upper member 42 has been reversed so that it no longer faces rearward or outwardly, but forwardly over the trunk of the car 22. Each ski mount has a sleeve 158 which can be moved or clamped using hand bolts 160. Sleeves 158 are provided with bushings 162 through which a rod 164 is threaded to extend to lateral sides of the members 40, 42. At each end of a rod 164 is a fixed ski support 166 in the form of a rubber cushioned plate 168 and an elongate fastener 170 such as a wide, strong Velcro-type strap.

Positioning of ski mounts 152, 154 along members 40, 42 respectively determines the height and angle of skis 150 with respect to car 22.

Having thus explained a car mount and carrier rack in accordance with the invention, its advantages can be appreciated. Variations from the described embodiments can be made without departing from the scope of the invention. For example, the car mount and rack can be located at the front license plate area.

What is claimed is:

1. A carrier rack for a vehicle having a longitudinal axis from front to rear, the vehicle having a car mounted receiver, comprising;
   (a) a main rack member adapted to be mounted to the car mount receiver and extending generally upward therefrom;
   (b) an upper member slidably mounted directly to the main rack member in interlocking relationship therewith, so that the upper member generally lies parallel to a vertical plane defined by the longitudinal axis of the vehicle, the upper member being adjustably mountable to the main rack member so as to face forwardly when mounted in a first direction and to face rearwardly when mounted in a second direction which is opposite to the first direction; and
   (c) a single bike mount slidably mounted directly to the upper member in interlocking relationship therewith, wherein the bike mount receives the weight of a bike to be carried and comprises:
      (i) a sleeve slidingly mounted around the upper member;
      (ii) a grooved member affixed to said sleeve and having an externally open groove shaped to partially receive a top tube and a seat tube of a bike;
      (iii) means for holding said top tube and said seat tube in said groove;
      (iv) elongate resilient means placed within said groove to enable said holding means to firmly grip said top and seat tubes of the bike; and
      (v) wherein said grooved member further comprises an angle bracket having perpendicular sides which define said groove and being bent along an angle selected to enable said top and scat tubes of the bike to partially fit between the sides of said angle bracket.

2. The carrier rack as claimed in claim 1 wherein said upper member has an end-located sleeve sized and shaped to slidingly fit around the main rack member in interlocking relationship against rotation of the upper member around the main rack member; and means for locking the upper member in place along the main rack member.

3. The carrier rack as claimed in claim 1 wherein said main rack member has a rectangular cross-section and wherein said sleeve has a rectangular bore sized to snugly enclose the main rack member while enabling the upper member to be moved along the main rack member.

4. The carrier rack as claimed in claim 1 wherein the bike mount has a sleeve which fits snugly and slidingly around the upper member and the upper member is mounted in a rearward direction pointing away from the vehicle; and wherein the bike mount further comprises a means for clamping the sleeve of the bike mount to the upper member.

5. The carrier rack as claimed in claim 4 wherein said upper member has a rectangular cross-section and wherein said bike mount sleeve has a rectangular cross-section.

6. The carrier rack as claimed in claim 1 wherein said grooved member comprises an elongate upper support for the top tube of the bike and an elongate side support for the seat tube of the bike.

7. A carrier rack for a vehicle having a longitudinal axis from front to rear, the vehicle having a car mounted receiver, comprising:
   (a) a main rack member adapted to be mounted to the car mount receiver and extending generally upward therefrom;
   (b) an upper member slidably mounted directly to the main rack member in interlocking relationship therewith, so that the upper member generally lies parallel to a vertical plane defined by the longitudinal axis of the vehicle, the upper member being adjustably mountable to the main rack member so as to face forwardly when mounted in a first direction and to face rearwardly when mounted in a second direction which is opposite to the first direction; and
   (c) ski mounts slidably mounted directly to the main rack member and upper member in interlocking relationship therewith, wherein the ski mounts receive the weight of skis to be carried and comprises a means for clamping the ski mounts to the main rack and upper members.

8. The carrier rack as claimed in claim 7 wherein said ski mounts include sleeves sized to snugly surround said main rack and upper members; said main rack and upper members having rectangular cross-sections and said ski mount sleeves having a rectangular bore.

9. The carrier rack as claimed in claim 8 wherein said ski mounts have ski supports formed of rubber cushioned plates and means for clamping skis to said rubber cushioned plates.

10. The carrier rack as claimed in claim 8 wherein said sleeves on the ski mounts have bushings and wherein a rod extends through the bushing and wherein ski supports are affixed to ends of said rod whereby said ski supports can be rotated to position skis mounted thereto.

11. A mountable rack system for a vehicle having a license plate area where a license plate is affixed to the vehicle by attachment means extending through holes in the license plate, comprising:
   (a) an attachment assembly which comprises:
      (i) a vehicle attachment plate having a from surface and a rear surface, the rear surface being sufficiently flat to permit the vehicle attachment plate to fit between the vehicle body and the license plate, the vehicle attachment plate having mounting holes therein which are sized and spaced commensurate with holes in the license plate so as to enable attachment means to extend through both the license plate holes and the attachment plate mounting holes and the vehicle body license plow area mount the vehicle attachment plate to the vehicle;
      (ii) a shelf extending from a lower edge of the vehicle attachment plate in a generally horizontal direction; and
      (iii) a rack receiver mount having a predetermined cross-sectional shape and being affixed to the shelf and extending outwardly from the vehicle attachment plate, said receiver mount being sized to retain a rack to be mounted thereto,
      wherein the attachment assembly is capable of withstanding forces to which it is exposed when in use without the need for stabilizing elements as part of the attachment assembly;

(b) a lower rack member received within the rack receiver mount and having a predetermined cross-sectional shape, the cross-sectional shapes associated with the rack receiver mount and the lower member being selected to enable their interlocking interengagement;

(c) a main rack member having a predetermined cross-sectional shape and extending generally vertically upward from the lower member when the lower member is interengaged with the rack receiver mount;

(d) an upper member slidably mounted on said main rack member and having an end with a predetermined cross-sectional shape sized for generally vertical slidable and lockable engagement with the main rack member, the cross-sectional shapes associated with the main rack member and the end of said upper member being selected to fit with interlock against relative rotation between them; and (e) anchoring means for comprising a strap having two ends, one end of the strap being attached to the main rack member and the other end of the strap adapted to be anchored to the vehicle, to stabilize the main rack member relative to the vehicle along its longitudinal axis.

12. The carrier rack as claimed in claim 11 wherein said upper member has an end-located sleeve sized and shaped to slidingly fit around the main rack member in interlocking relationship against rotation of the upper member around the main rack member; and means for locking the upper member in place along the main rack member.

13. The carrier rack as claimed in claim 12 wherein said main rack member has a rectangular cross-section and wherein said sleeve has a rectangular bore sized to snugly enclose the main rack member while enabling the upper member to be moved along the main rack member.

14. The carrier rack as claimed in claim 11 further comprising a bike mount having a sleeve which fits snugly and slidingly around the upper member, which is mounted in a rearward direction pointing away from the vehicle; and means for clamping the sleeve of the bike mount to the upper member.

15. The carrier rack as claimed in claim 14 wherein said upper member has a rectangular cross-section and wherein said bike mount sleeve has a rectangular cross-section.

16. The carrier rack as claimed in claim 14 wherein said bike mount comprises:

a sleeve slidingly mounted around the upper member;

a grooved member affixed to said sleeve and having an externally open groove shaped to partially receive a top tube and a seat tube of a bike;

means for holding said top tube and said seat tube in said groove;

elongate resilient means placed within said groove to enable said holding means to firmly grip said top and seat tubes of the bike; and wherein said grooved member further comprises an angle bracket having perpendicular sides which define said groove and being bent along an angle selected to enable said top and seat tubes of the bike to partially fit between the sides of said angle bracket.

17. The carrier rack as claimed in claim 16 wherein said grooved member comprises an elongate upper support for the top tube of the bike and an elongate side support for the seat tube of the bike.

18. The carrier rack as claimed in claim 11 which further comprises ski mounts slidably mountable to the main rack member and the upper member, and means for clamping the ski mounts to the main rack and upper members.

19. The carrier rack as claimed in claim 18 wherein said ski mounts include sleeves sized to snugly surround said main rack and upper members; said main rack and upper members having rectangular cross-sections and said ski mount sleeves having a rectangular bore.

20. The carrier rack as claimed in claim 19 wherein said ski mounts have ski supports formed of rubber cushioned plates and means for clamping skis to said rubber cushioned plates.

21. The carrier rack as claimed in claim 19 wherein said sleeves on the ski mounts have bushings and wherein a rod extends through the bushing and wherein ski supports are affixed to ends of said rod whereby said ski supports can be rotated to position skis mounted thereto.

* * * * *